U S008849091B2

(12) United States Patent
Kato

(10) Patent No.: US 8,849,091 B2
(45) Date of Patent: *Sep. 30, 2014

(54) TRANSPORT STREAM PROCESSING DEVICE, AND ASSOCIATED METHODOLOGY OF GENERATING AND ALIGNING SOURCE DATA PACKETS IN A PHYSICAL DATA STRUCTURE

(75) Inventor: Motoki Kato, Kanagawa (JP)

(73) Assignee: Sony Corporation, Tokyo (JP)

(*) Notice: Subject to any disclaimer, the term of this patent is extended or adjusted under 35 U.S.C. 154(b) by 936 days.

This patent is subject to a terminal disclaimer.

(21) Appl. No.: 12/777,010

(22) Filed: May 10, 2010

(65) Prior Publication Data
US 2010/0215344 A1 Aug. 26, 2010

Related U.S. Application Data

(60) Division of application No. 11/126,167, filed on May 11, 2005, now Pat. No. 8,041,184, which is a continuation of application No. 09/668,228, filed on Sep. 22, 2000, now Pat. No. 7,106,946.

(30) Foreign Application Priority Data

Sep. 28, 1999 (JP) .................................... 11-274231

(51) Int. Cl.
H04N 9/80 (2006.01)
(Continued)

(52) U.S. Cl.
CPC .......... *G11B 20/1217* (2013.01); *G11B 27/034* (2013.01); *H04N 5/907* (2013.01); *G11B 27/105* (2013.01); *H04N 9/8063* (2013.01); *H04N 9/888* (2013.01); *G11B 27/322* (2013.01); *H04N 5/9201* (2013.01); *H04N 5/781* (2013.01); *G11B 27/3027* (2013.01); *H04N 9/8042* (2013.01); *G11B 2020/1232* (2013.01); *H04N 5/85* (2013.01)
USPC ....................................... 386/241

(58) Field of Classification Search
USPC ......................................... 386/353, 248, 241
See application file for complete search history.

(56) References Cited

U.S. PATENT DOCUMENTS 5,455,684 A 10/1995 Fujinami et al.
5,602,956 A 2/1997 Suzuki et al.
(Continued)

FOREIGN PATENT DOCUMENTS

EP 0 606 868 7/1994
EP 0 668 697 8/1995
(Continued)

OTHER PUBLICATIONS

Japanese Office Action issued Nov. 15, 2011 in patent application No. 2010-225155.

(Continued)

Primary Examiner — David Harvey
(74) Attorney, Agent, or Firm — Oblon, Spivak, McClelland, Maier & Neustadt, L.L.P.

(57) ABSTRACT

A transport stream reproduction device, method thereof, and recording medium for efficiently reproducing transport streams. The reproduction section acquires an entry point map from said recording medium, compares a presentation time stamp (PTS) listed in the entry point map with the designated reproduction start position, and searches entry points adjacent to said designated reproduction start position, and a calculation section calculates an address of a transport packet corresponding to the entry points.

6 Claims, 21 Drawing Sheets

(51) Int. Cl.
*G11B 27/034* (2006.01)
*G11B 27/10* (2006.01)
*G11B 27/32* (2006.01)
*H04N 5/92* (2006.01)
*G11B 27/30* (2006.01)
*H04N 9/804* (2006.01)
*G11B 20/12* (2006.01)
*H04N 5/907* (2006.01)
*H04N 9/806* (2006.01)
*H04N 9/888* (2006.01)
*H04N 5/781* (2006.01)
*H04N 5/85* (2006.01)

(56) References Cited

U.S. PATENT DOCUMENTS

| | | |
|---|---|---|
| 5,701,386 A | 12/1997 | Yoneyama |
| 5,703,997 A | 12/1997 | Kitamura et al. |
| 5,740,307 A | 4/1998 | Lane |
| 5,793,927 A | 8/1998 | Lane |
| 5,838,872 A | 11/1998 | Kawara |
| 5,850,501 A | 12/1998 | Yanagihara |
| 5,881,203 A | 3/1999 | Fujinami et al. |
| 5,982,978 A | 11/1999 | Sakazaki |
| 6,031,960 A | 2/2000 | Lane |
| 6,075,920 A | 6/2000 | Kawamura et al. |
| 6,115,537 A | 9/2000 | Yamada et al. |
| 6,304,717 B1 | 10/2001 | Fujinami |
| 6,363,212 B1 | 3/2002 | Fujinami et al. |
| 6,445,877 B1 * | 9/2002 | Okada et al. ............ 386/248 |
| 7,106,946 B1 * | 9/2006 | Kato ...................... 386/241 |
| 2001/0014207 A1 | 8/2001 | Kawamura et al. |
| 2004/0047610 A1 | 3/2004 | Tanaka |

FOREIGN PATENT DOCUMENTS

| | | |
|---|---|---|
| EP | 0 748 129 | 12/1996 |
| EP | 0 771 122 | 5/1997 |
| EP | 0 899 968 | 3/1999 |
| EP | 0 926 903 | 6/1999 |
| JP | 8-129830 | 5/1996 |
| JP | 8-235832 | 9/1996 |
| JP | 11-215144 | 8/1999 |
| JP | 11-242563 | 9/1999 |
| JP | 2001-167528 | 6/2001 |

OTHER PUBLICATIONS

Extended European Search Report issued on Jan. 18, 2011 in corresponding European Application No. 10 18 5271.

* cited by examiner

FIG. 3 source_packet

| SYNTAX | No. OF BITS | MNEMONICS |
|---|---|---|
| source_packet() { | | |
|     TP_extra_header() | | |
|     transport_packet() | | |
| } | | |

FIG. 4

TP_extra_header

| SYNTAX | No. OF BITS | MNEMONICS |
|---|---|---|
| TP_extra_header() { | | |
|     copy_permission_indicator | 2 | |
|     arrival_time_stamp | 30 | |
| } | | |

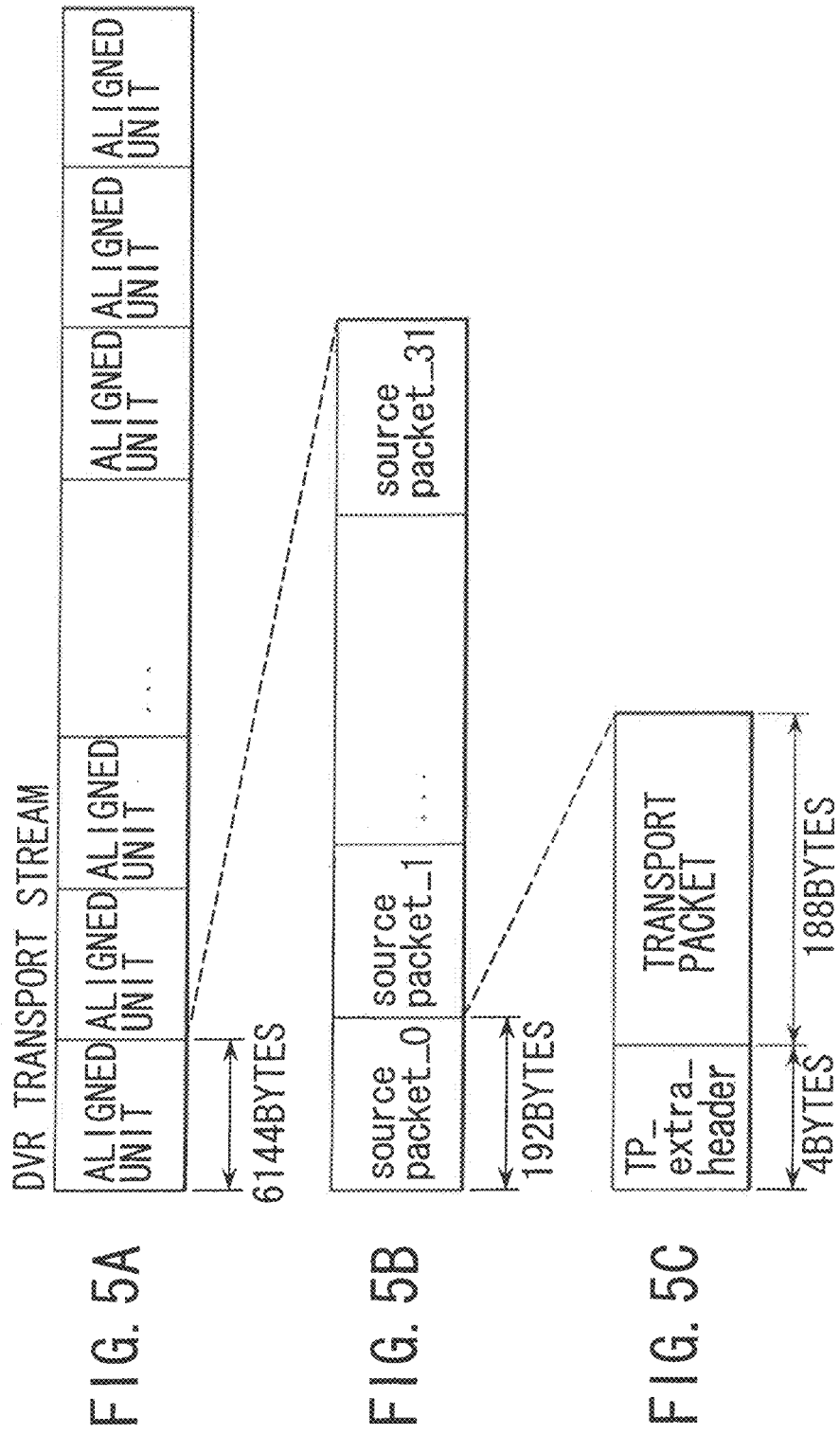
F I G. 5A
F I G. 5B
F I G. 5C

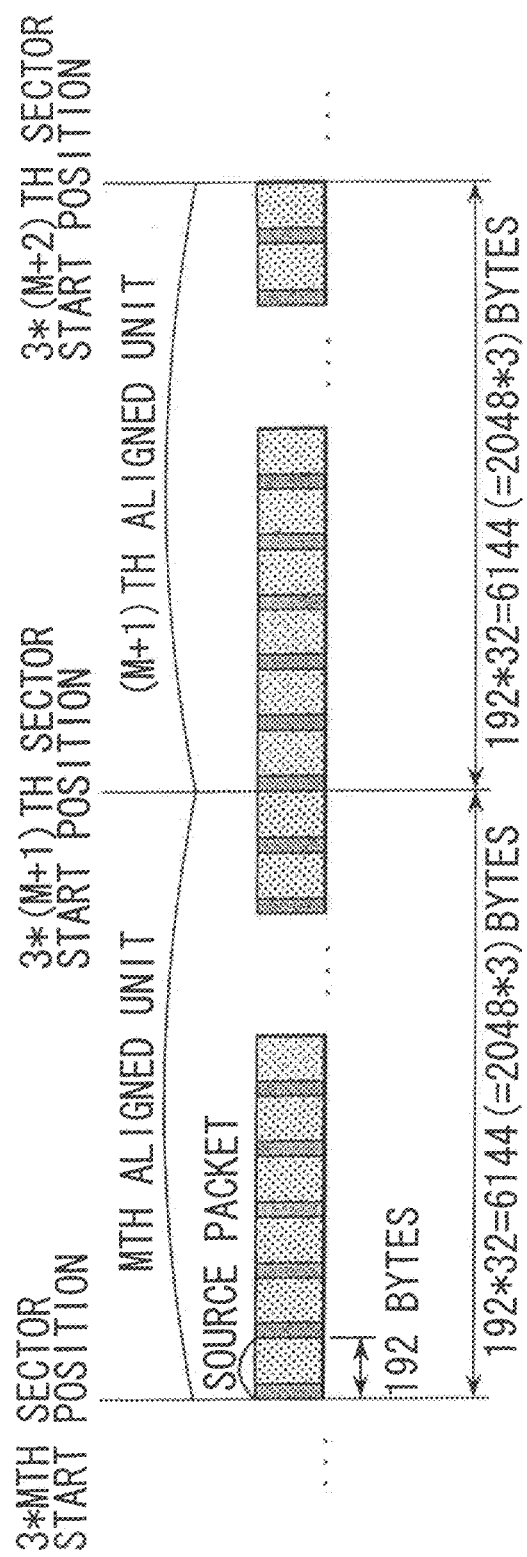

FIG. 11

| video_PID | |
|---|---|
| offset_source_packet_number | |
| I_start_packet_No | PTS |
| ⋮ | ⋮ |
| 32*M+4 | pts1 |
| 32*(M+1)+5 | pts2 |
| ⋮ | ⋮ |

TRANSPORT STREAM PROCESSING DEVICE, AND ASSOCIATED METHODOLOGY OF GENERATING AND ALIGNING SOURCE DATA PACKETS IN A PHYSICAL DATA STRUCTURE

CROSS-REFERENCE TO RELATED APPLICATIONS

This application is a divisional of and claims the benefit of priority from U.S. application Ser. No. 11/126,167, filed May 11, 2005, the entire contents of which are incorporated herein by reference. U.S. application Ser. No. 11/126,167 is a continuation of U.S. application Ser. No. 09/668,228, filed Sep. 22, 2000, and is based upon and claims the benefit of priority from prior Japanese Patent Application No. 11-274231, filed Sep. 28, 1999.

BACKGROUND OF THE INVENTION

1. Field of the Invention

This invention relates to a transport stream recording device, method thereof, transport stream reproduction device, method thereof, a program recording medium and a data recording medium and relates in particular to a transport stream recording device, method thereof, transport stream reproduction device, method thereof, a program recording medium and a data recording medium ideal for efficient record of reproduction of digital multi-channel broadcast signals transmitted as transport streams onto a data recording medium.

2. Description of Related Art

In Europe and North America, as well as domestically in Japan, MPEG2 (Moving Picture Experts Group Phase 2) transport streams are utilized in digital satellite broadcasts and land digital broadcasts, etc. MPEG video packets and MPEG audio packets for the audio and video of the broadcast program are time-multiplexed on these transport streams. The length of one transport stream packet is 188 bytes.

If the transport stream corresponding to the program could be recorded as digital signals on the receive side, then a high quality audiovisual program can be viewed repeatedly at any time with no degradation of image or sound quality.

If the transport stream of a the program could further be recorded for instance, on a recording medium capable of random access such as a hard disk or optical disk, then random access reproduction highly responsive to user commands can be achieved.

However, random accessible recording mediums such as hard disks and optical disks are usually formatted in logical block units of 2048 bytes called sectors and the data written in the sectors, based on an FAT (File Allocation Table) and UDF (Universal disk format), etc.

To achieve reproduction with high responsiveness, the AV (audio-visual) data contained in the transport stream must be recorded in sector units (or integer multiples of sector units). However, as mentioned above, the transport packet is 188 bytes, while the sector is 2048 bytes so that the sector and byte are therefore not well compatible with each other and the problem currently exists that AV data contained in the transport stream cannot be recorded in sector units (or integer multiples of sector units).

Further, even if the AV data could be recorded in sector units (or integer multiples of sector units), the high responsiveness of the random access reproduction makes address control of the recorded AV data difficult and troublesome to achieve.

SUMMARY OF THE INVENTION

In view of the above circumstances of the related art, this invention has the object of efficiently recording or reproducing transport streams by attaching four byte transport extra headers (TP_extra_header) to each transport packet to generate a source packet and establish a new data unit constituted by an aligned unit equivalent to a three sector portion of 32 source packets.

A first transport stream recording device of this invention comprises a header attachment section to attach a header to a transport packet constituting the transport stream and generate a source packet; and a record section to record a predetermined specified number of the source packets on the data recording medium as aligned units.

A first transport stream recording device of this invention further comprises a counter to count the number of transport packets comprising the transport stream, and a null packet generator to generate null packets according to the count from the counter.

A first transport stream recording method of this invention records the input transport streams on a data recording medium wherein the transport stream recording method adds a header to the transport packet comprising the transport stream and; records a predetermined specified number of the source packets on the data recording medium as aligned units.

A program for a first program recording medium of this invention comprises a header attachment process to attach a header to a transport packet constituting a transport stream and generate a source packet; and a process to record a predetermined specified number of the source packets on the data recording medium as aligned units.

A transport stream reproduction device of this invention comprises a reproduction section, a calculating section to calculate the address corresponding to the designated reproduction start position, and a controller to control the reproduction section so that read-out of the transport packets starts from the calculated address, and the aligned units are comprised of a predetermined specified number of collected source packets attached with headers to constitute the transport stream.

A transport stream reproduction device of this invention further comprises a deletion section to convert a designated deletion range into the aligned unit data region and to delete the converted aligned units recorded on the transport streams.

A transport stream reproduction method of this invention comprises a step of calculating the address corresponding to the designated reproduction start position, and a step of reading out the transport packet from said calculated address and control the start of the reproduction section, in which the aligned units comprises a predetermined specified number of collected source packets attached with headers to constitute the transport stream.

A program of a program recording medium of this invention comprises a step of calculating the address corresponding to the designated reproduction start position, a step of reading out said transport packet from said calculated address and controlling the start of said reproduction section, in which the aligned units comprises a predetermined specified number of collected source packets attached with headers to constitute the transport stream.

In a first transport stream recording device and method, and a program recording medium of this invention, a source packet attached with a header is generated in a transport packet constituting a transport stream; the generated source packets are each grouped into a specified number of source packets and aligned units generated, and the aligned units recorded on the recording medium.

In a second transport stream recording device and method, and a program recording medium of this invention, a source packet attached with a header is generated in a transport packet constituting a transport stream; the generated source packets are each grouped into a specified number of source packets and aligned units generated, and the aligned units recorded on the recording medium.

A transport stream reproduction device and method, and a program for a recording medium of this invention are characterized in that the reproduction start position is specified, the address on the data recording medium corresponding to the specified reproduction start position is calculated, and the read out of the transport packet is started from the calculated address on the data recording medium.

BRIEF DESCRIPTION OF THE DRAWINGS

FIG. 3 is a drawing showing the syntax of the source packets.

FIG. 4 is a drawing showing the relation of aligned units and sectors.

FIG. 5A through 5C are flowcharts illustrating the data structure of the aligned units.

FIG. 6 is a drawing showing the relation of aligned units and sectors.

FIG. 11 is a drawing showing a typical entry point map.

DETAILED DESCRIPTION OF THE INVENTION

Figure 1:
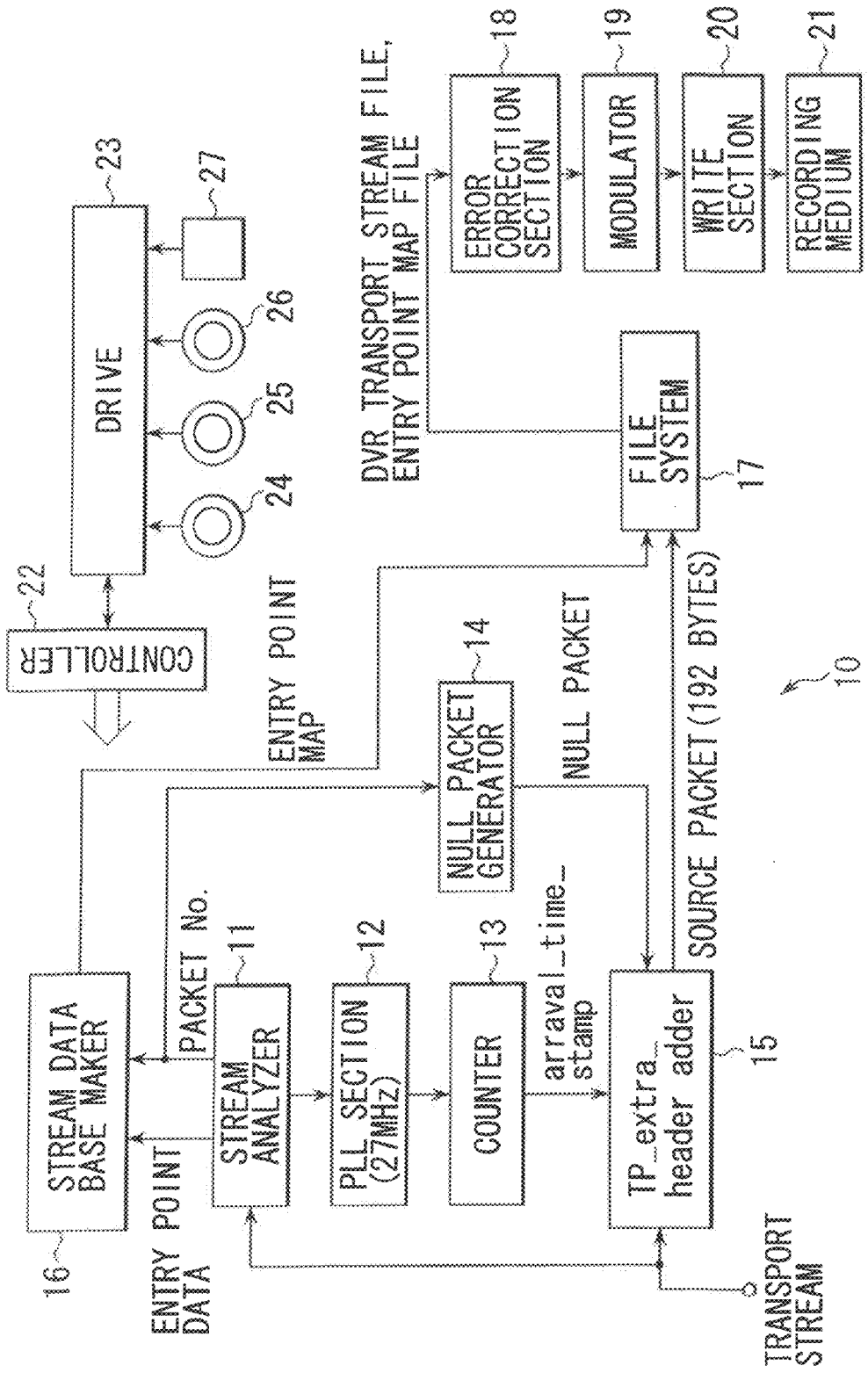
FIG. 1 is a block diagram showing the structure of the recording device 10 of the embodiment of the invention.
Figure 2:
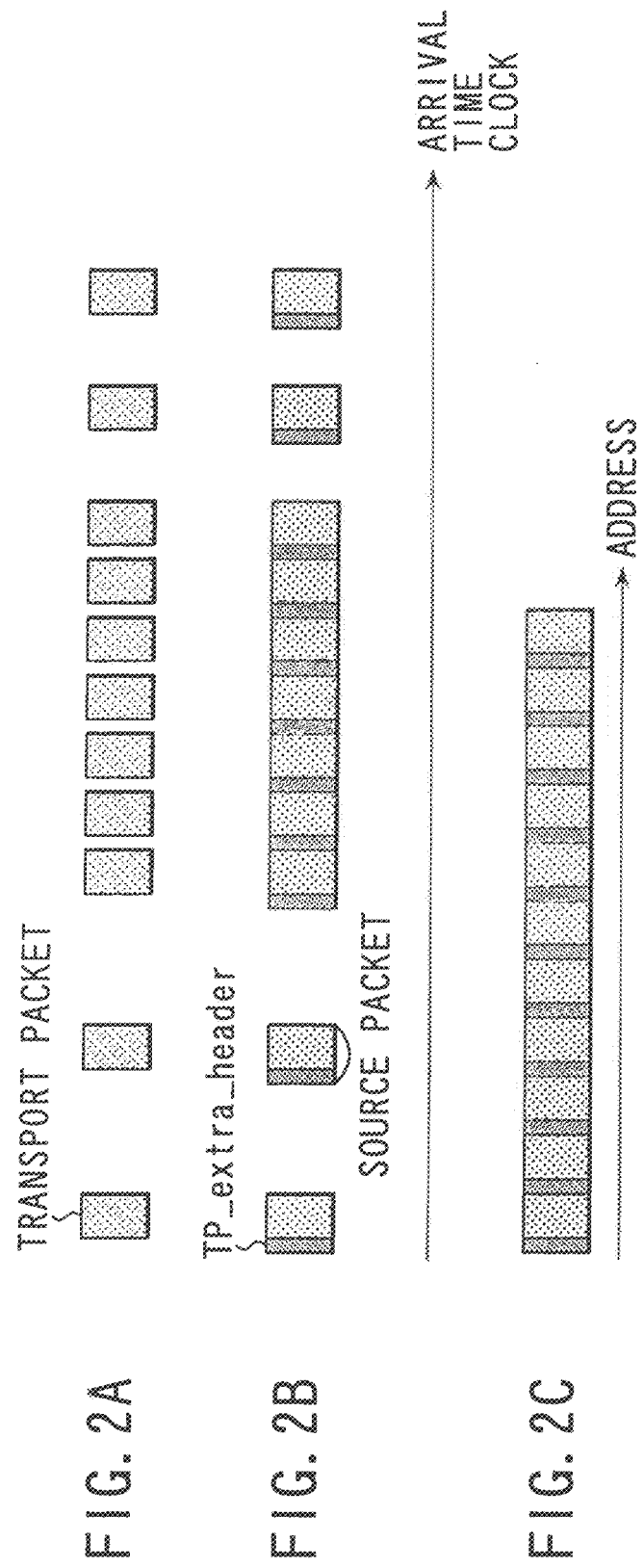
FIG. 2A through 2C are diagrams showing the sequentially processed transport packet in the recording device 10.

A first example comprising the embodiment of the transport stream recording device of this invention is described while referring to FIG. 1. The recording device 10 attaches a transport packet extra header and generates a source packet as shown in FIG. 2B, into each packet of the transport stream of one program input to the recording device 10 at irregular periods as shown in FIG. 2A, from the set-top box for receiving digital broadcast signals. The generated DVR transport stream set with source packets is recorded on the recording medium 21 formatted for example in sectors of a fixed length as shown in FIG. 2C. The horizontal axes of FIG. 2A and FIG. 2B indicate the time axis of arrival times in the recording device 10 of the transport packet.

A stream analyzer 11 of the recording device 10 reads (loads) out the packets stored with the PAT (Program Association Table), PMT (Program Map Table), and the PCR (Program Clock Reference) while referring to the sequentially input PID of the transport packets, and outputs the PCR to the PLL (Phase Locked Loop) 12. The stream analyzer 11 counts the number of sequentially input transport packets, and outputs that count (value) to the null packet generator 14 as a packet No.

The stream analyzer 11 also detects a position (entry point) to start random access reproduction of the transport stream that was input, and outputs information (entry point data) designating the entry point to the stream data base maker 16. More specifically, a transport stream containing I picture data at the beginning as defined by MPEG2 is detected as the entry point data, and the packet No. of the applicable transport packet and the PTS (Presentation Time Stamp) of the applicable I picture are supplied to the stream data header maker 16. The PTS is information contained in the PES packet header to the MPEG2 system standard, and indicates the reproduction time (elapsed time period from reference time) of the applicable I picture based on the reproduction start time of the program.

The PLL 12 aligns the 27 megahertz system clock signal by utilizing the PCR input from the stream analyzer 11 and outputs the clock signal to the counter 13. The counter 13 synchronizes with the system clock signal input from the PLL 12, counts up an arrival time clock (arrival_time_clock) showing the input time to the recording device 10 of the transport packet. Also, the counter 13 at the same time outputs an arrival time stamp (arrival_time_stamp) as the arrival time clock sample value, to the transport extra header (TP_extra_header) 15. The arrival time clock is here reset to zero when the transport packet at the beginning of the program is input.

When the counter 13 IS for instance, a binary counter that counts clock pulses from a 27 megahertz clock, and the bit length of the arrival time stamp is N, then the N bit of the LSB (Least Significant Bit) of the count value is output as the arrival time stamp.

In other words, if the binary counter value for counting clock pulses from the 27 megahertz clock at time t is expressed as arrival_time_clock(t), and the bit length of the arrival time stamp is expressed as N, then the arrival time stamp ATS(t) for the time t, is calculated by the following equation (1).

$$ATS(t) = arrival\_time\_clock(t) \% 2^N \qquad (1)$$

The "%" in equation (1) is the operator for calculating the positive integer remainder.

FIG. 3 is a drawing showing the syntax of the source packet. The TP_extra_header( ) indicates a transport packet extra header with a 4 byte length. The transport_packet( ) indicates an MPEG2 transport packet with a 188-byte length as defined in ISO/IEC13818-1.

FIG. 4 is a drawing showing the syntax of the transport packet extra header when the arrival time stamp was set as a 30-bit length.

The copy permission indicator is an integer corresponding to one of the copy restrictions (copy free, no more copy, copy once, or copy prohibited) on the payload of the transport packet. When N=30 in equation (1), the arrival_time_stamp is an integer having the value specified by ATS(t).

The null packet generator 14 generates a null packet (188 bytes) not signifying information, and corresponding to the last packet No. input from the stream analyzer 11 and outputs that null packet to the transport packet extra header adder 15. In other words, when the total number of transport packets comprising the program input to the recording device 10 (equivalent to packet No. that was input last) is not a multiple of 32, the packet No. that was last input, and a null packet with a value larger than that packet No. and number differential nearest a multiple of 32 is output to the transport packet extra header adder 15.

Therefore, the packets input to the transport packet extra header adder 15 are an integer multiple of 32 and consist of null packets from the null packet generator 14 and external transport packets. The null packet here, is a transport packet ID (PID) value that is a hexadecimal value of 0x1FFF and a packet whose payload holds no significant data.

Simultaneous with input of the packet, the transport packet extra header adder 15 attaches a transport packet extra header (4 bytes) containing an arrival time stamp input from the counter 13, to the externally input transport packet (188 byte), or the null packet input from the null packet generator 14, and generates a 192 byte source packet such as shown in FIG. 5C and outputs the source packet to a file system 17.

The stream data base maker 16 generates an entry point map by using entry point data (packet No. of transport packet storing the I picture PTS, and applicable I picture data) input from the stream analyzer 11, and outputs the entry point map to the file system 17.

The file system 17 divides the input of source packets (192 bytes each) from the transport packet extra header adder 15 in units of 32 source packets as shown in FIG. 5B, files each unit of 32 source packets as aligned unit (6144 bytes) which is a logical data unit. Then, as shown in FIG. 5A, outputs the aligned units placed consecutively in the DVR transport stream, to the error correction section 18. The file system 17 also performs filing of the entry point maps input from the stream data base maker 16 and makes an entry point map file, and outputs the entry point map file to the error correcting section 18.

The error correcting section 18 adds error correcting information to the file input from the file system 17 and outputs it to the modulator 19. The modulator 19 modulates the file from the error correction section 18 using a specified method and outputs the file to the write section 20. The write section 20 records one aligned unit (6144 bytes) on three sectors (6144 bytes=(2048*3)) of the data recording medium 21. In other words, the Mth aligned unit as shown in FIG. 6 is recorded on the (3*m) through ((3*M)+2) sectors of the recording medium 21, and the following Mth+1 aligned unit is recorded on the (3*(M+1)) through (3*(M+1)+2) sectors of the recording medium 21. The write section 20 also records the entry point map on the specified position of the data recording medium 21.

The data recording medium 21 is randomly accessible and the data recording region is formatted for instance in sectors on a recording medium such as a hard disk, an optical disk, a magneto-optical disc or a semiconductor memory.

A controller 22 controls a drive 23, loads a control program stored onto a program recording medium such as a magnetic disk 24, an optical disk 25, a magneto-optical disc 26, or a semiconductor memory 27. The controller 22 also controls each section of the recording device 10 based on the control program that was loaded as well as commands input by the user.

Figure 7:
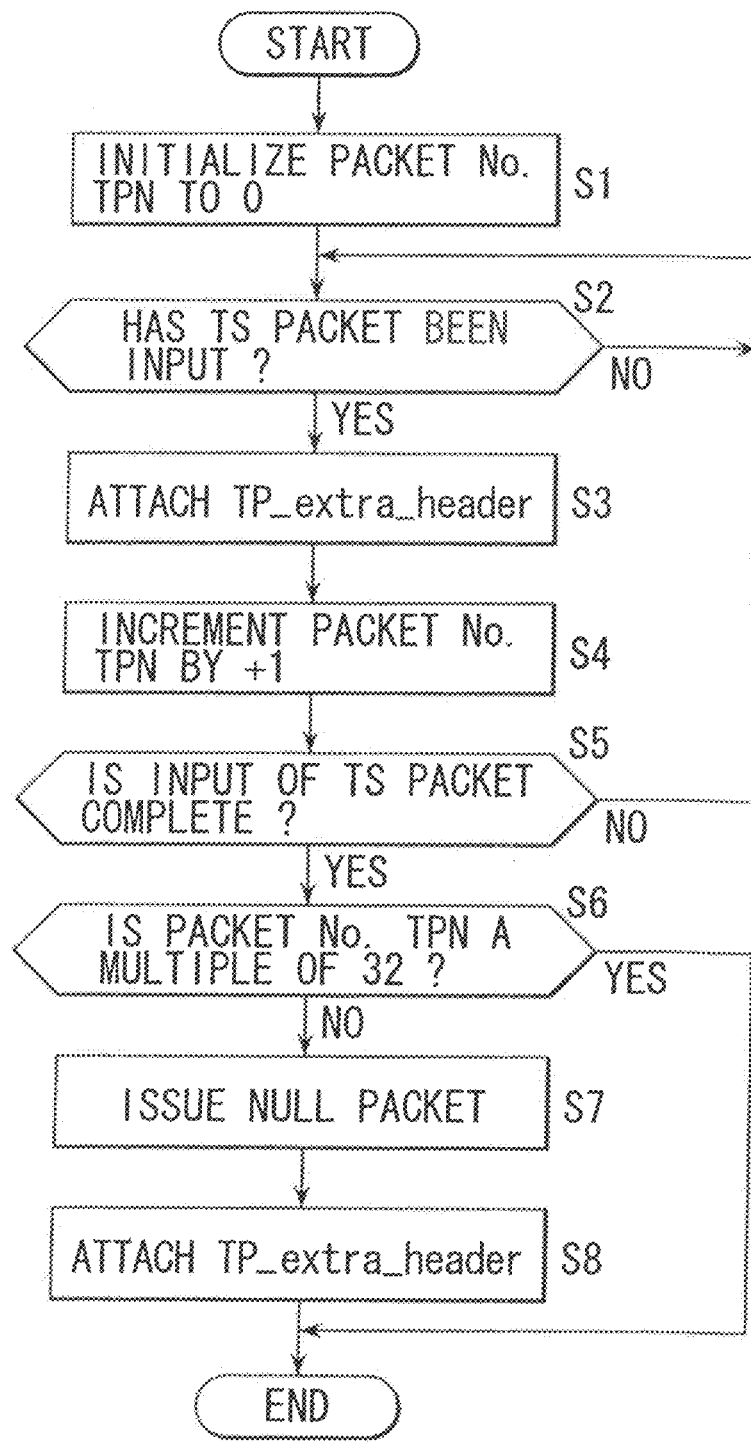
FIG. 7 is a flowchart illustrating the transport stream recording process for the recording device 10.

The transport stream recording process of the recording device 10 is next described while referring to the flowchart of FIG. 7. This transport stream recording process starts with a record start command from the user.

In step S1, the stream analyzer 11 resets the packet No. TPN to 0. In step S2, the stream analyzer 11 determines whether or not a transport packet was externally input. The stream analyzer sets to standby (wait) until determined that a transport packet was externally input. Operation proceeds to step S3 when determined that a transport packet was externally input.

In step S3, the transport packet extra header adder 15 attaches a transport packet header (four bytes) containing an arrival time stamp input from the counter 13, to the externally input transport packet (188 bytes), generates a source packet of 192 bytes, and outputs the source packet to the file system 17.

Figure 8:
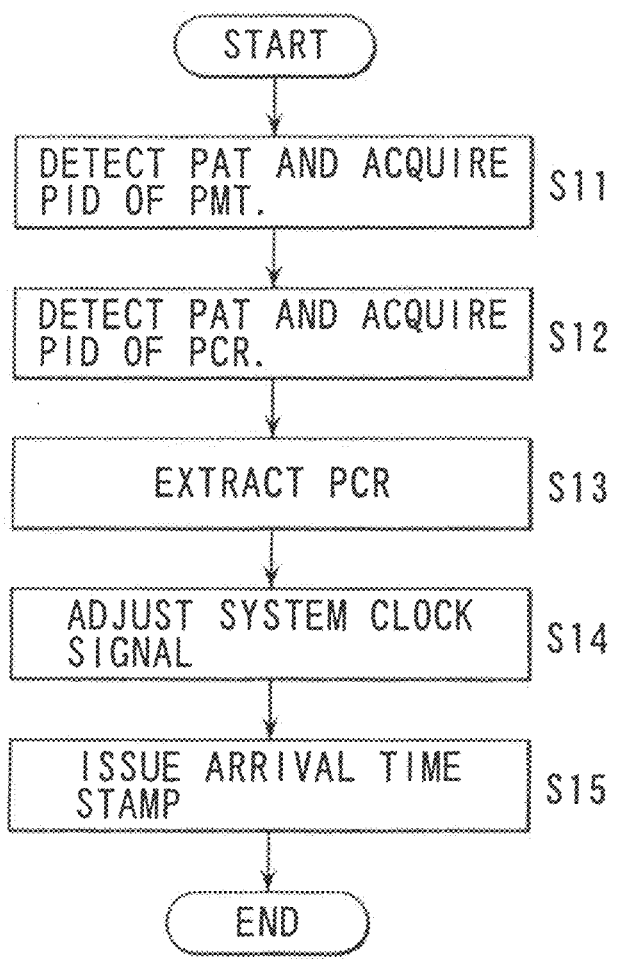
FIG. 8 is a flowchart showing process for generating the arrival time stamp.

Here, the processing for generating the arrival time stamp contained in the transport packet extra header is described while referring to the flowchart of FIG. 8.

In step S11, the PAT of the transport stream that was input is stored, a PAT packet consisting of a PID of 0x0000 is detected, and the PID of the packet stored with the PMT contained in the PAT (hereafter called PMT packet) is acquired. In step S12, the PMT is detected based on the PID of the PMT packet acquired in step S11, and the PID of the packet stored with the PCR listed in the PMT (hereafter called PCR packet) is acquired. In step S13, the PCR is extracted based on the PID of the PCR packet acquired in step S12, and the extracted PCR is supplied to the PLL 12.

In step S14, the system clock signal is aligned in the PLL12 by using the PCR input from the stream analyzer 11, and the system clock signal supplied to the counter 13. In step S15, the arrival time counter is synchronized by the counter 13 with the system clock signal from the PLL12, and arrival time counter made to count upwards. At the same time, that sampling value is output as the arrival time stamp to the transport packet extra header adder 15.

Returning to FIG. 7, in step S4, the stream analyzer 11 increments the packet No. TPN only by 1, and outputs it to the null packet generator 14.

In step S5, the stream analyzer 11 determines whether or not the external input of transport packets has ended. When determined that external input of transport packets has not ended, the operation returns to step S2 and the processing from step S2 is repeated.

In the period for repeating the processing from step S2 through S5, the source packet output to the file system 17 is subdivided into 32 aligned units. The DVR transport stream file pre-stuffed with the aligned units, is also added with error correction information in the error correction section 18, and after modulation in the modulator 19, is recorded on the recording medium 21 by the write section 20.

In step S5, when determined that external input of transport packets has ended, the operation proceeds to step S6.

In step S6, the null packet generator 14 determines whether or not the packet No. TPN last input from the stream analyzer 11 is a multiple of 32. When determined the packet No. TPN that was input last is not a multiple of 32, operation proceeds to step S7. At this time, a source packet of less than 32 pieces not filed as an aligned unit is present.

In step S7, the null packet generator 17 generates a null packet with the number differential from the nearest multiple of 32 and also larger than the last packet No. TPN that was input, and outputs it to the transport packet extra header adder 15. In step S8, the transport packet extra header adder 15 attaches a transport packet extra header to the null packet input from the null packet generator 14, generating a source packet and outputs it to the file system 17.

The file system 17 outputs both the source packets not made into aligned units because of having less than 32 pieces, with the source packets of the null packet, to the subsequent stage as a combined 32 source packets of aligned units. Error correction information is from hereon, added in the same way, and after modulation by the modulator 19, is recorded on the recording medium 21 by the write section 20.

As described above, even if the total number of transport streams constituting the one program that was input per the recording device 10 is not a multiple of 32, a null packet is generated of an amount equal to the differential (insufficiency) with the multiple of 32, so that aligned units equivalent to a three sector portion of data can be recorded onto the recording medium 21. Data controlled as sector (units) can therefore be loaded from the recording medium 21.

Figure 9:
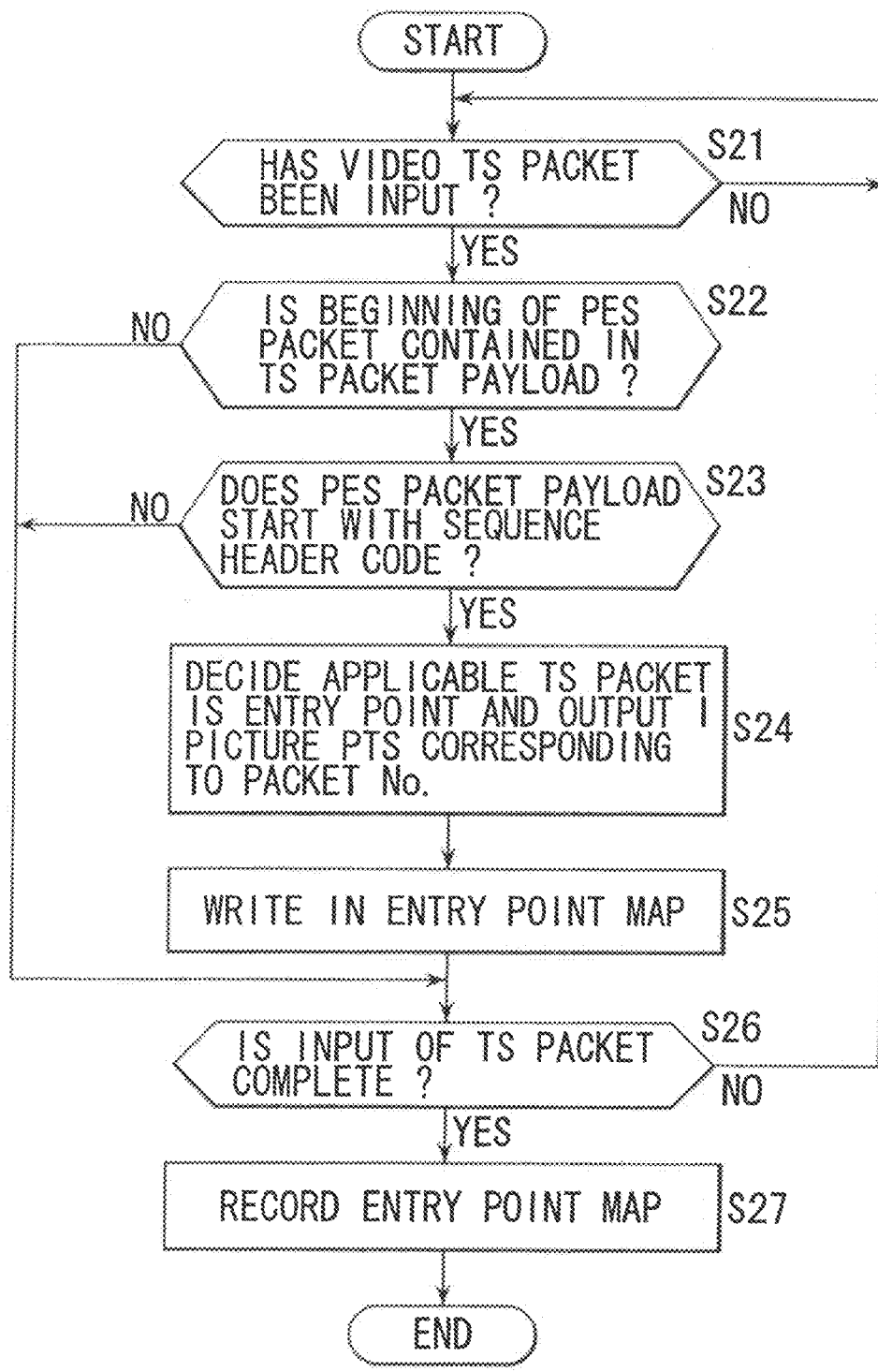
FIG. 9 is a flowchart illustrating the recording process for the entry point map of the recording device 10.

The process for entry point map recording, executed in parallel with the above described transport stream record processing is next described while referring to the flowchart in FIG. 9. This entry point map record processing starts simultaneously with the above mentioned transport stream record processing.

In step S21, the stream analyzer 11 determines whether or not a transport stream packet was input externally, and is in standby (waits) until determined that a transport stream packet was input externally. When determined that a transport stream packet was input externally, the operation proceeds to step S22.

In step S22, the stream analyzer 11 determines whether or not the payload of the applicable transport packet starts from the first byte of the PES packet, by detecting whether or not a 1 is listed in the payload unit start indicator (payload_unit_start_indicator) contained in the transport packet header of the transport packet. When a 1 is detected in the payload unit start indicator and the payload of the transport packet is determined to start from the first byte of the PES packet, the operation proceeds to step S23.

In step S23, the stream analyzer 11 determines whether or not an MPEG video sequence header code (sequence_header_code) constituted by 0x000001B3 is listed in the beginning of the PES packet contained in the transport packet payload. When determined that an MPEG video sequence header code is listed, the I picture data is determined to be listed in the payload of the applicable transport packet, and the operation proceeds to step S24.

In step S24, the stream analyzer 11 determines if the applicable transport packet is the entry point, and outputs the PTS of the I picture stored in the applicable transport packet and the packet No. of the applicable transport packet, along with the identification information (video_PID) of the applicable program to the stream data base maker 16, as the entry point data.

In step S25, the stream data base maker 16 writes the entry point data input from the stream analyzer 11 into the entry point map.

Figure 10:
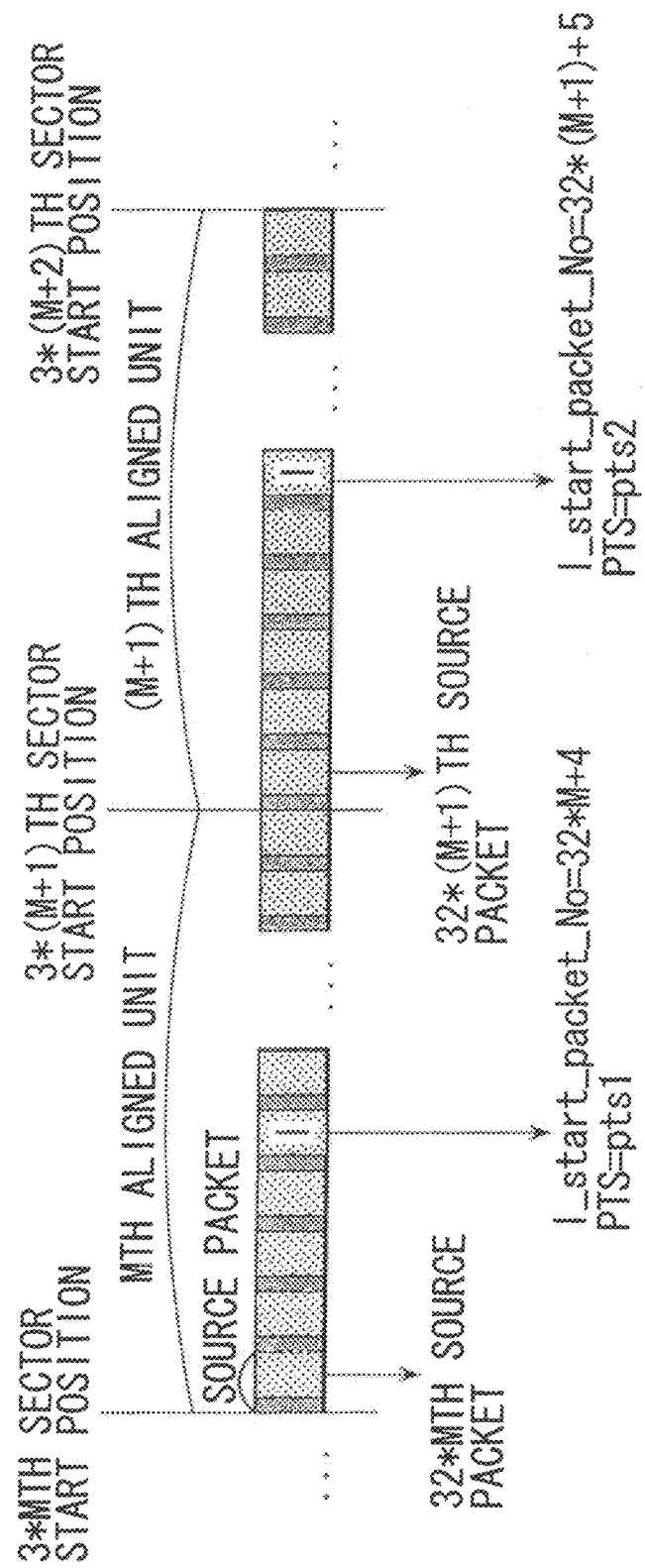
FIG. 10 is a drawing showing the relation of the PTS and the packet No. listed in the entry point map.

When determined for instance, as shown in FIG. 10, that I picture data is listed in the payload of the transport packet having a packet No. (32*M+4), then as shown in FIG. 11, the packet No. (32*M+4) and that PTS (=pts 1) are correspondingly written in the entry point map. Also, when determined that I picture data is listed in the payload of the transport packet constituted by packet No. (32*M+1)+5), then the packet No. (32*M+1)+5) and that PTS (=pts2) are written to correspond to it in the entry point map.

In the entry point map of FIG. 11, the packet No. of the packet in which the I picture data is stored is shown as the I_start_packet_No. Also in the entry point map, the offset source packet number (offset_source_packet_number) is the packet No. attached to the packet at the beginning of the applicable program and the reset value is 0.

In step S26, the stream analyzer 11 determines whether or not the external input of transport packets is ended. When determined that external input of transport packets has not ended, the operation returns to step S21 and subsequent processing is repeated. When determined in step S26, that external input of transport packets has ended, the operation proceeds to step S27.

In step S27, the stream data base maker 16 outputs the entry point map that was made, to the file system 17. The file system 17 performs filing on the entry point map that was input, and outputs this to the subsequent stage. Error correction information is from hereon, added in the same way, and after modulation by the modulator 19, is recorded on the recording medium 21 by the write section 20.

The entry point map recorded in the data recording medium 21 as described above, is utilized in the reproduction processing described later on.

The packet No. is listed on the entry point map of the above embodiment, as the information for specifying the entry point position, so that a smaller byte quantity is required, compared to when expressing the entry point position by utilizing the byte accuracy of the address.

Figure 12:
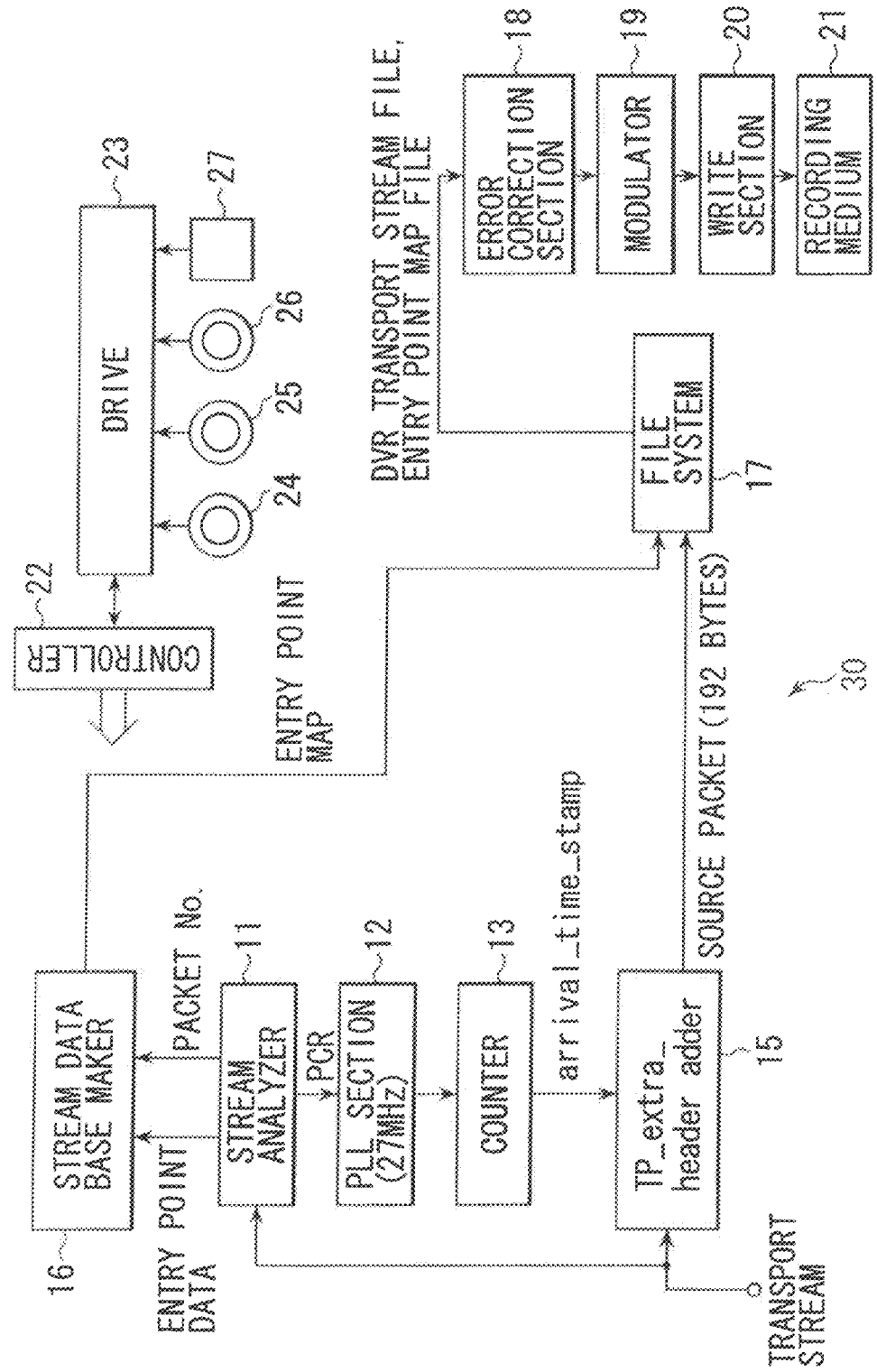
FIG. 12 is a block diagram showing the structure of the recording device 30 of the embodiment of the invention.

A block diagram of the second embodiment of the recording device constituted by the transport stream recording device of the invention is shown next in FIG. 12. This recording device 30 is the recording device 10 of the first embodiment shown in FIG. 1 with the null packet generator 14 omitted. Other component blocks however are common with the recording device 10.

Figure 13:
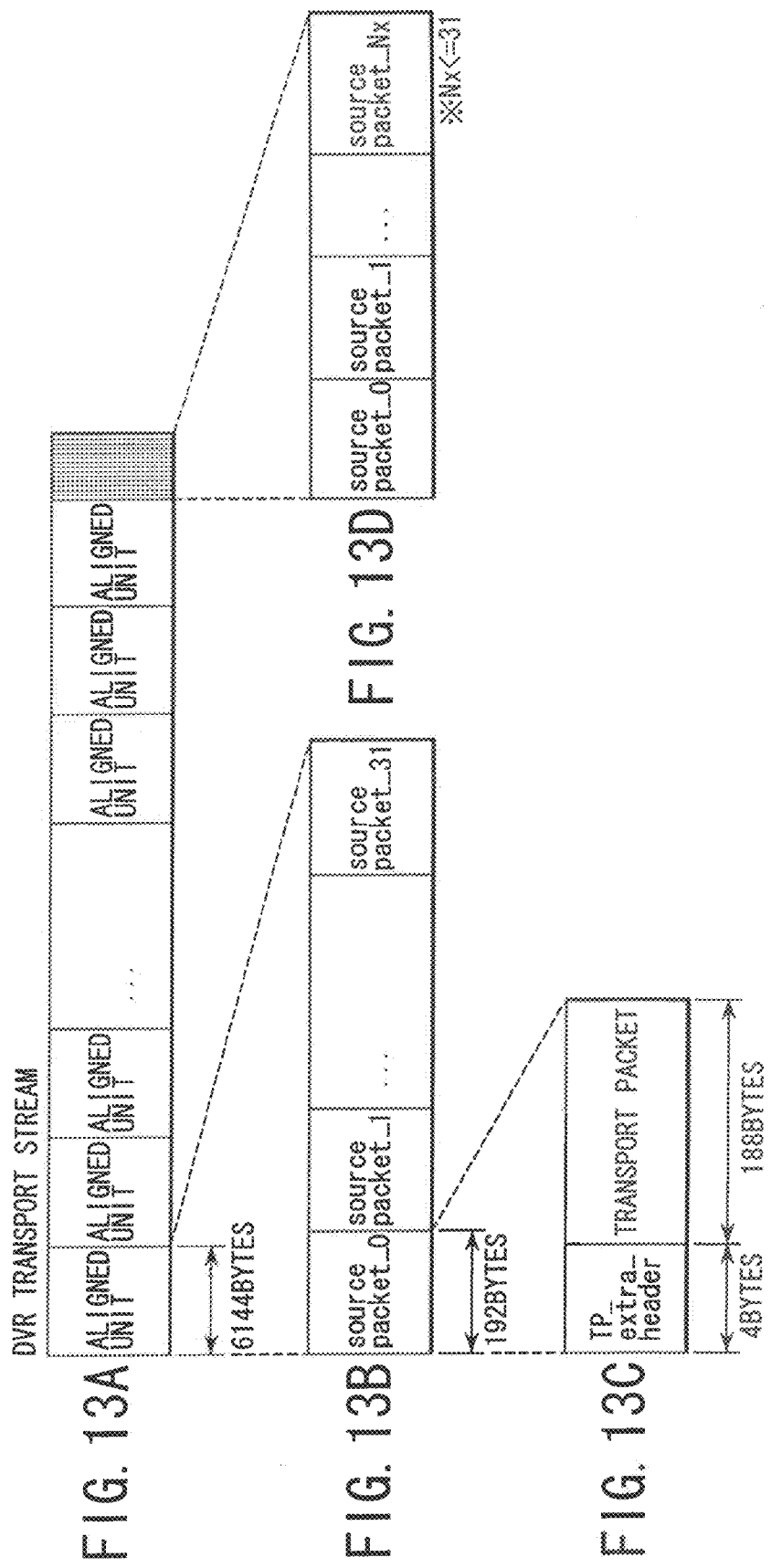
FIG. 13A through 13D are drawings showing the data configuration of the aligned units.

The DVR transport stream generated by the recording device 30 is shown in FIG. 13A through 13C. The point differing from the DVR transport stream (FIGS. 5A through 5C) generated by the recording device 10 as shown in FIG. 13D is that when the source packets on the ends do not total 32 pieces, a null packet is not added, and the recording performed as is. The number (Nx+1) of source packets not amounting to 32 pieces in the end portions is calculated with the following equation (2).

$$Npacket = \text{file size}/192$$

$$Nx = Npacket \% 32 \qquad (2)$$

Here, the Npacket is the total number of source packets comprising, the DVR transport stream. The file size is the data quantity (byte quantity) of the DVR transport stream file managed by the file system 17. The "/" signifies division eliminating the part of the quotient below the decimal point. The "%" signifies calculation of the remainder.

In the stream data base maker 16, if the total number of Npackets for the source packet comprising the DVR transport stream are listed in the stream data base, then the Nx can be calculated in the reproduction device 40 (described later).

Figure 14:
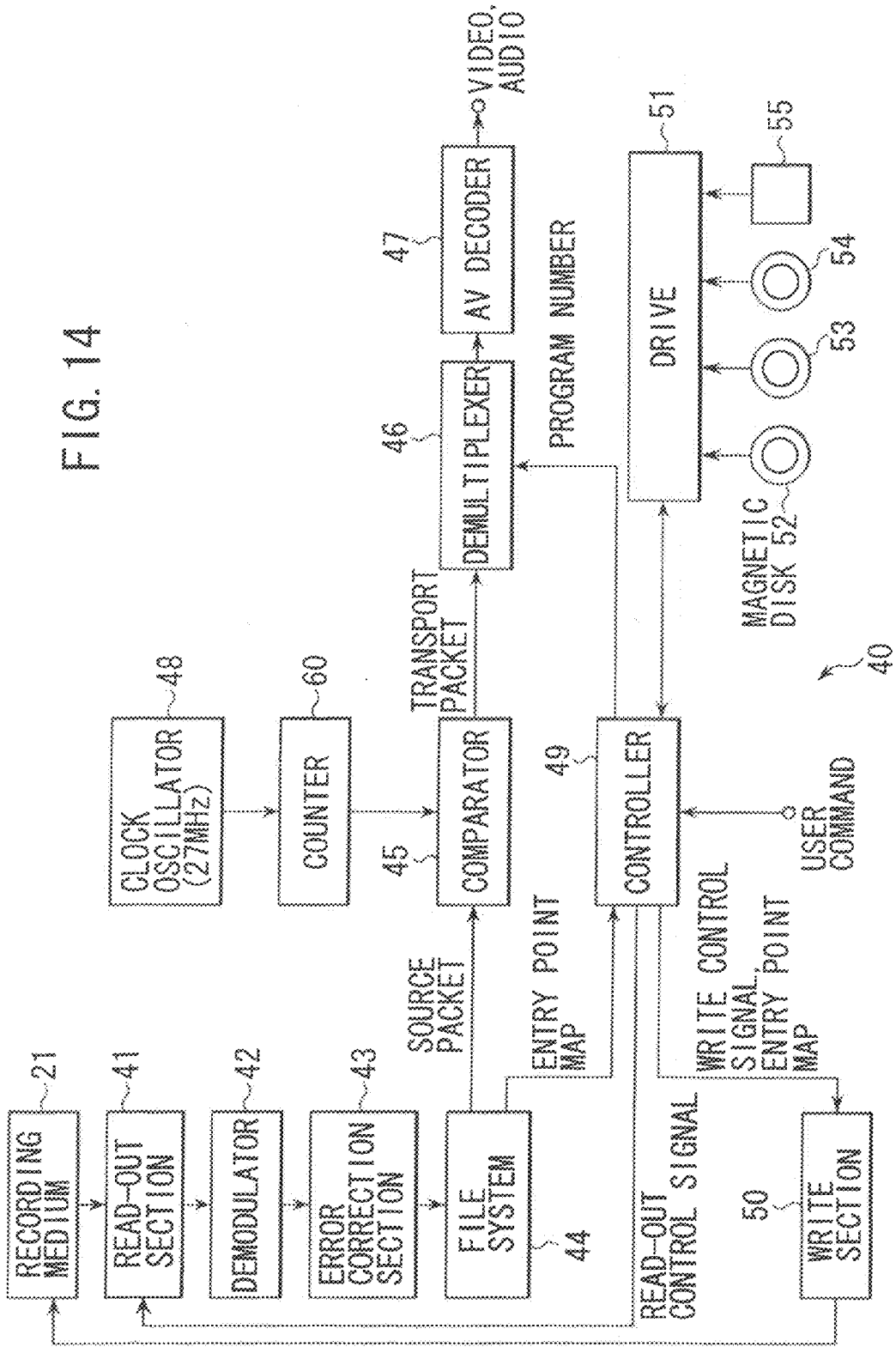
FIG. 14 is a block diagram showing the structure of the reproduction device 40 of the embodiment of the invention.

Next, FIG. 14 shows a block diagram of the reproduction device constituting the embodiment of the transport stream reproduction device of this invention. The reproduction device 40 reproduces the AV signal corresponding to the applicable DVR transport stream file from the data recording medium 21 storing the DVR transport stream file and the entry point map file by the recording device 10 or the recording device 30.

The reproduction device 40 also has a function to delete sections of the recorded DVR transport stream file.

A read-out section 41 reads out (or loads) signals corresponding to the DVR transport stream files or entry point map files from the recording medium 21 that match the read-out/control signals input from the controller 49 and outputs them to a demodulator 42. The demodulator 42 demodulates the signals input from the read-out section 41 per the modulator 19 of recording devices 10, 30, and outputs the signals to the error correction section 43. The error correction section 43 performs error correction of the signals based on error correction information supplied from the error correction section 18 of recording devices 10, 30 and outputs the DVR transport stream file or entry point map file thus obtained, to the file system 44.

The file system 44 separates the DVR transport stream file input from the error correction section 43 into source packets and outputs them to a buffer 45. The file system 44 also supplies the entry point map input from the error correction section 43 to the controller 49.

The clock oscillator 48 generates a 27 megahertz arrival time clock pulse and outputs it to the counter 60. The counter 60 resets the arrival time stamp of the first source packet from the DVR transport stream, counts the 27 megahertz clock pulses, calculates the time based on the clock counter value and outputs it to the comparator 45.

The arrival time stamp contained in the transport packet extra header of the source packet, is output by the comparator 45 to a demultiplexer 46, in a transport packet with the transport packet extra header removed from the applicable source packet, at a timing equivalent to the current time supplied from the counter 60.

For instance, when the time issued by the counter 60 is displayed as a value on a binary counter of 27 megahertz clock pulses and further when the arrival time stamp is displayed at a an N bit length time with an accuracy of 27 megahertz, then a transport packet with the transport packet extra header removed from the applicable source packet is output from the comparator 45 to the demultiplexer 46 at a timing equivalent to the arrival time stamp and the N bit on the LSB side of the time issued by the counter 60.

The demultiplexer 46 extracts the transport packets for the audio and video matching the program specified by the user, from the transport packet input from the comparator 45, and outputs the transport packets to an AV decoder 47. The AV decoder 47, decodes each video and audio transport packet from the demultiplexer 46, and outputs the video and audio signals thus obtained to a latter stage.

The controller 49 regulates a drive 51, loads the control program stored on a program recording medium such as a magnetic disk 52, an optical disk 53, a magneto-optical disk 54 or a semiconductor memory 55, and controls each section of the reproduction device 40 based on commands input from the user and the control program that was loaded.

When sections of the DVR transport stream file recorded on the recording medium 21 were erased, the write section 50 rewrites (updates) specified sections (described later) of the entry map supplied from the controller 49, and records these changes on the data recording medium 21.

Figure 15:
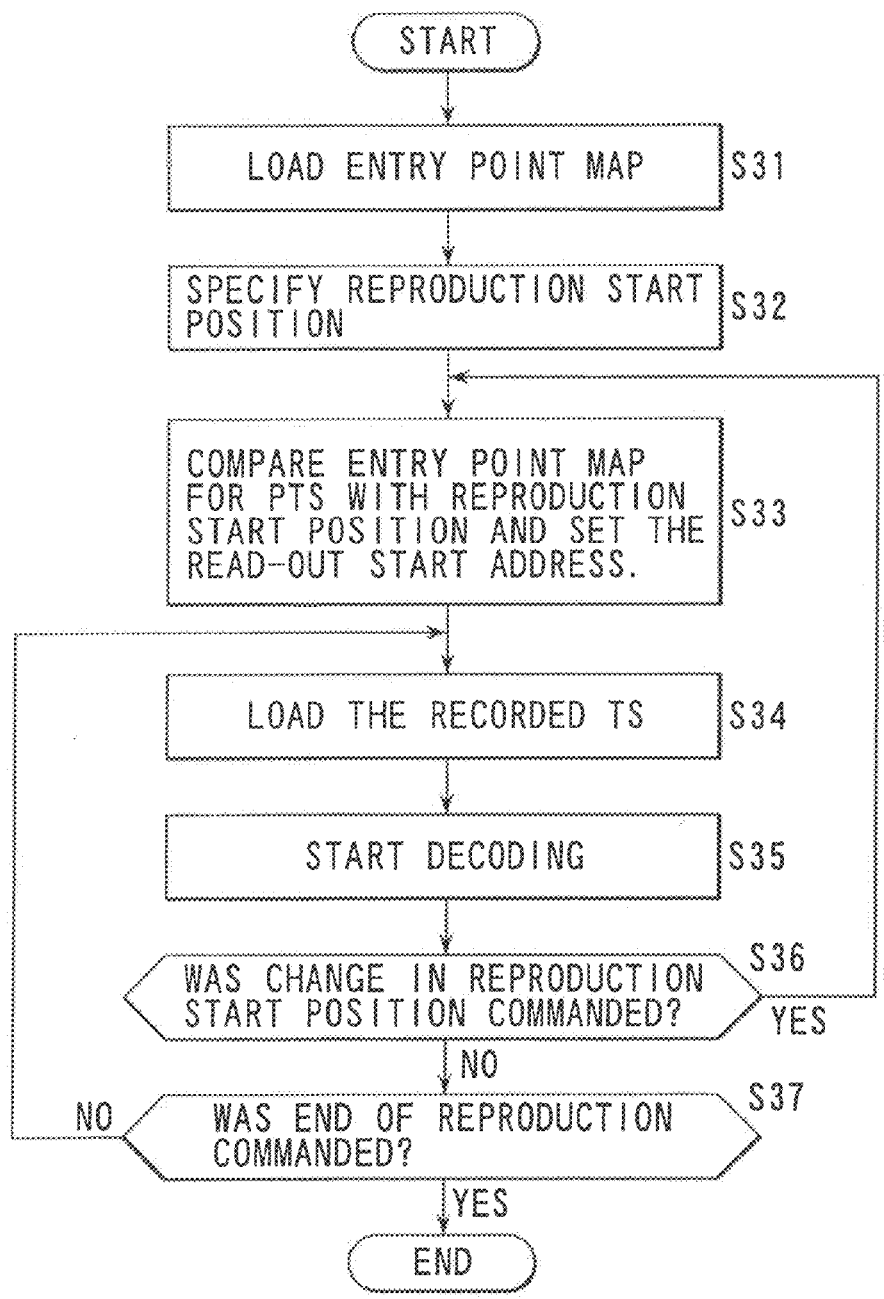
FIG. 15 is a flowchart illustrating the reproduction processing of the reproduction device 40.

The reproduction processing of the reproduction device 40 is next described while referring to the flowchart of FIG. 15. This reproduction processing starts when program reproduction instructions, and reproduction start commands are input from the user.

In step S31, the entry point map corresponding to the program reproduced from the recording medium 21 is loaded by the read-out section 41, and supplied to the controller 49 after the processing from the demodulator 42 through the file system 44. In step S32, the reproduction start position (Expressed by using the elapsed time from the beginning of the program.) of the program is input to the controller 49 by the user.

In step S33, the controller 49 compares the reproduction start position input in step S32, with the PTS listed in the entry point map obtained in step S31, and establishes the read-out start address of the DVR transport stream by utilizing the packet No. (I_start_packet_No) of the entry point having the PTS value nearest the reproduction start position that was input.

More specifically, the AUNEP number for the aligned units contained in the entry point source packet; the offset packet quantity OFTEP from the beginning of the aligned unit shown by AUNEP to the entry point source packet; and further, the sector No. SNAU recorded at the beginning of the aligned unit shown by AUNEP; are calculated as the read-out start address as shown in equation (3).

$$AUNEP=(I\_start\_packet\_No-offset\_source\_packet\_number)/32$$

$$OFTEP=(I\_start\_packet\_No-offset\_source\_packet\_number)\%32$$

$$SNAU=AUNEP*3 \qquad (3)$$

Here, the symbol "/" signifies division that eliminates the part of the quotient below the decimal point. The symbol "%" signifies calculation of the remainder.

When for instance, the PTS of the entry point map shown in FIG. 11, starts reproduction from the entry point pts1, the packet No. (I_start_packet_No) is 32*M+4 so that the read-out start addresses are calculated as shown below using equation (3).

AUNEP=M
OFTEP=4
SNAU=3M

In step S34, the read-out section 41 starts read out (loading) from the recording medium 21 of the DVR transport stream from the read-out start address as established in step S33 based on control by the controller 49. The DVR transport stream that was read out is processed as needed from the demodulator 42 to the demultiplexer 46, and input to the AV decoder 47 as video and audio streams.

In step S35, the AV decoder 47 decodes the video and audio transport packets from the demultiplexer 46, and outputs the video and audio signals thus obtained to, for instance a monitor (not shown in the drawings).

In step S36, the controller 49 determines whether or not a change in the reproduction start position (such as random access reproduction) was commanded by the user. When determined that a change in the reproduction start position was commanded, the operation returns to step S33, the readout start position is once again established, and processing subsequent to step S33 is repeated.

In step S36, when determined that no change in the reproduction start position was commanded, operation proceeds to step S37. In step S37, the controller 49 determines whether or not the user commanded that reproduction end. When determined that the ending reproduction was not commanded, the operation returns to step S34 and processing subsequent to step S34 is repeated. That reproduction processing is later ended, when determined that ending of reproduction was commanded.

The reproduction processing as described above, is contrived to start reproduction from the entry point listed in the entry point map. The address in the recording medium 21 recorded with this entry point data can be easily found by a simple calculation so that control of the read-out position can be easily performed and quickly implemented.

Figure 16:
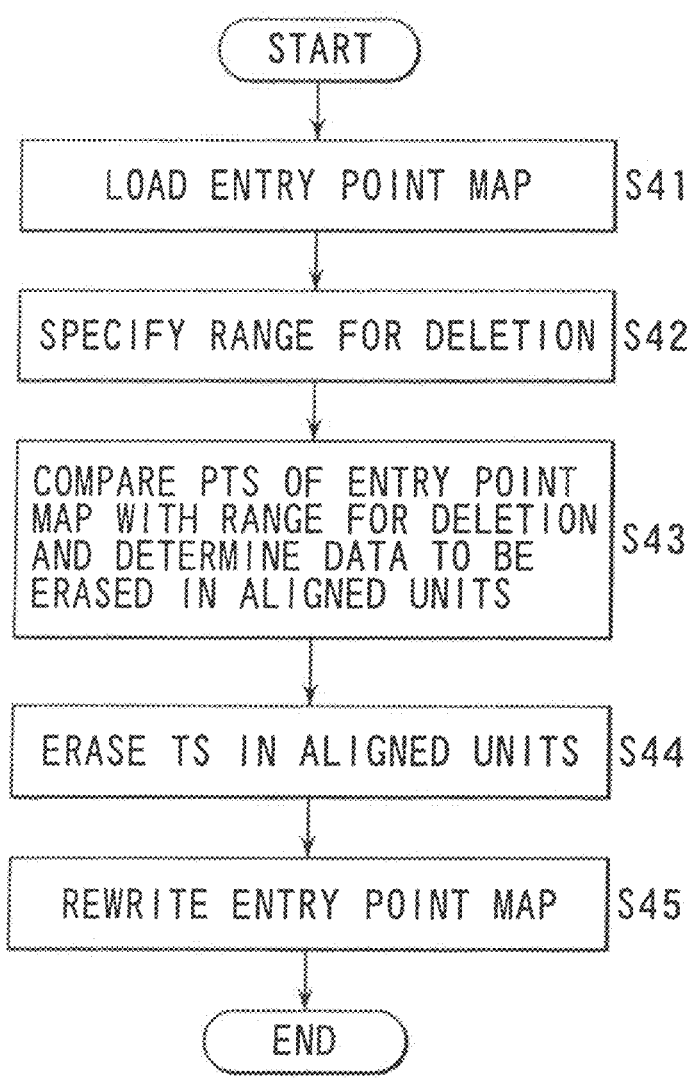
FIG. 16 is a flowchart illustrating the sectional deletion processing of the reproduction device 40.

The sectional deletion processing implemented by the reproduction device 40 on sections of the DVR transport stream file recorded on the recording medium 21 is next explained while referring to the flowchart of FIG. 16. This deletion (erasure) processing starts when instructions specifying program sections the user wants to sectionally delete, and commands to start sectional deletion are input from the user.

In step S41, an entry point map corresponding to the specified program is loaded from the recording medium 21 by the read-out section 41, and after the appropriate processing implemented from the demodulator 42 through the file system 44, the entry point map is supplied to the controller 49. In step S42, the user inputs the amount of program deletion (expressed by utilizing the elapsed time from the beginning of the program) to the controller 49.

In step S43, the controller 49 compares the range of program deletion input in step S42, with the entry point map obtained in step S41, converts the deletion (erasure) range into aligned units, and calculates the deletion range of the address by using the same calculation method as in step S33 of FIG. 15.

Figure 17:
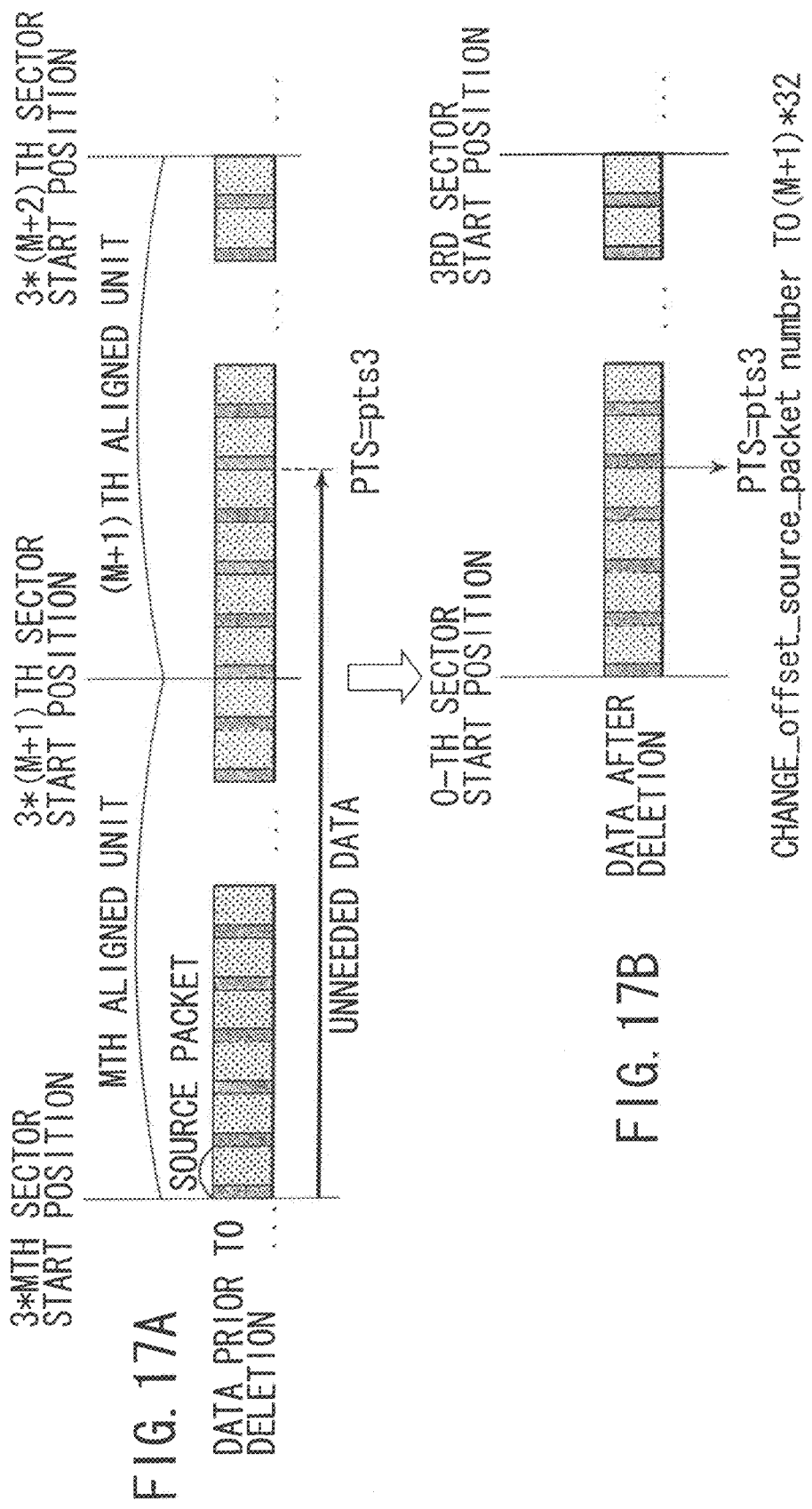
FIG. 17A through 17B are drawings showing the erasure of data in aligned units.

As shown for instance in FIG. 17A, when the range specified for erase by the user is from the beginning of the program to the pts3 source packet as the PTS inside the M+1th aligned unit, the actual range erased, is converted from the beginning of the program to the Mth aligned unit, and that address calculated.

In step S44, the controller 49 for instance makes the write section 50 write null data in the erase range area set in aligned units in step S43, to delete the recording in the erase as shown in FIG. 17B from the recording medium 21.

In step S45, the controller 39 revises (updates) the entry map and outputs it to the write section 50. The write section 50 writes the entry map onto the recording medium 21. More specifically, in the example shown in FIG. 17, the offset source packet number is rewritten to (M+1)*32. The end point data present in the erased program range is deleted, output to the write section 50 and written onto the recording medium 21.

In the deletion processing as described above, the DVR transport stream file is deleted in aligned units so that the undeleted portions of the transport stream file are kept recorded as aligned units.

This embodiment showed the recording device 10, recording device 30 and the reproduction device 40 as separate components however a structure combining the recording device 10 (or recording device 30) into one device may also be employed.

Further, in the above described embodiments, data was recorded in aligned units onto areas (in this case, a 3 sector area, in other words 2048 bytes*3) that were a multiple of the sector (sector size is 2048 bytes) on the recording devices 10, 30 of this invention, however the recording methods are not limited to this example.

A method for instance, for recording on a data recording medium having a sector size of 65536 (=64*1024) bytes is explained. An example for recording 32 aligned units on a 3 sector area (65536 bytes*3) is shown in FIG. 18.

Figure 18:
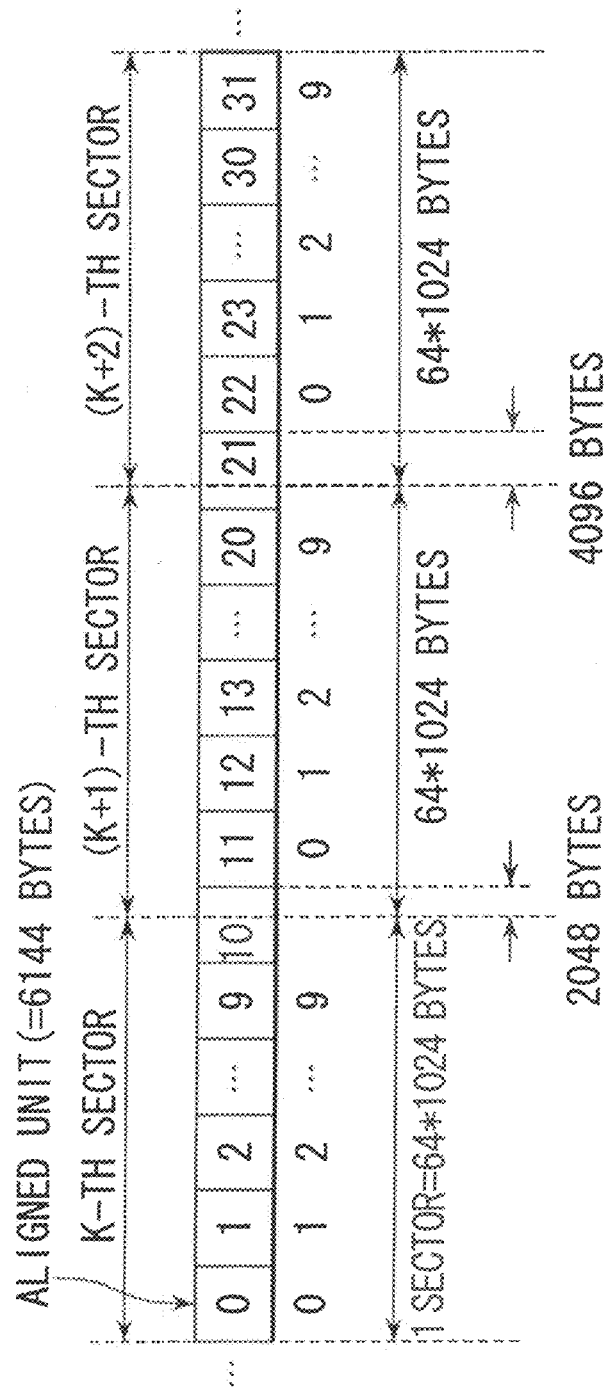
FIG. 18 is a drawing illustrating the method for recording the aligned units on the data recording medium 21 constituting a sector size of 65536 bytes.

The squares (□) in FIG. 18 indicate the aligned units, and the numerals in these squares (0 through 31) are the aligned unit Nos. recorded in the 3 sector portion. The 10th aligned unit and the 21th aligned unit are recorded striding two sectors. The numerals (1 through 9) below the squares (□) showing the aligned units, are the offset Nos. within the sectors holding all data in aligned units.

At the start of recording, as shown in FIG. 18, the beginning aligned unit is aligned at the sector start position. The first half of 4096 bytes (6144−2048) of the 0th through 9th aligned units and the 10th aligned units are recorded in the Kth (K is a positive integer) sector. The latter half of 2048 bytes (6144−4096) of the 10th aligned unit, the 11th through 20th aligned units, as well as the 21st aligned unit first half 2048 (=6144−4096) bytes are recorded in the K+1 sector. The latter half 4096 bytes of the 21st aligned unit, as well as the 22nd through 31st aligned units are recorded in the K+2 sector.

In the case of a UDF or FAT file system, (in other words, the sector size is 2048 bytes) the file start point data must be aligned with the sector start position, however when the sector size is 65536 bytes, the data of the file start point may start at a point within the sector not necessarily the sector start position. In that case, the file system has a sector start offset showing the file start point within the sector.

A method for deleting data at the beginning portion of a file when the sector size is 65536 bytes, is explained.

Figure 19:
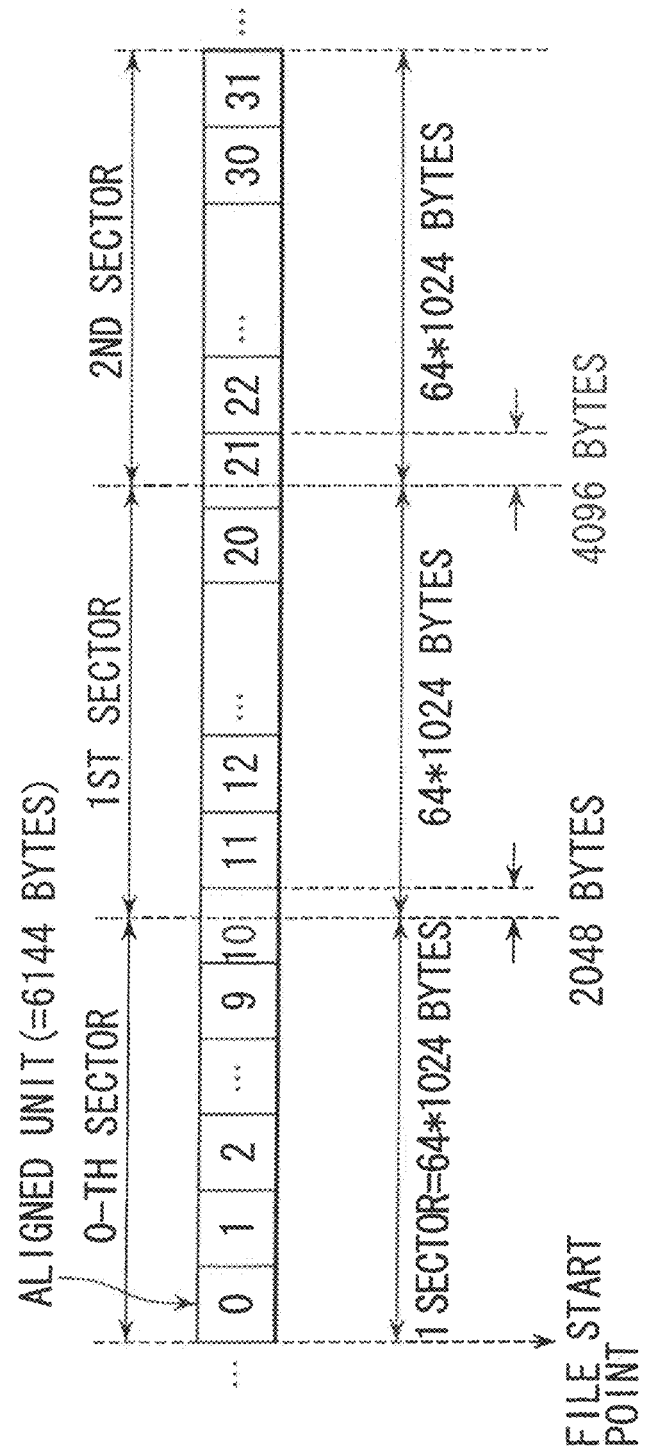
FIG. 19 is a drawing showing the relation of sectors and aligned units at the beginning of the recording.

The case of deleting data of the beginning portion of a file is explained. First of all, the initial aligned unit is aligned in sectors at the beginning of recording as shown in FIG. 19.

Figure 20:
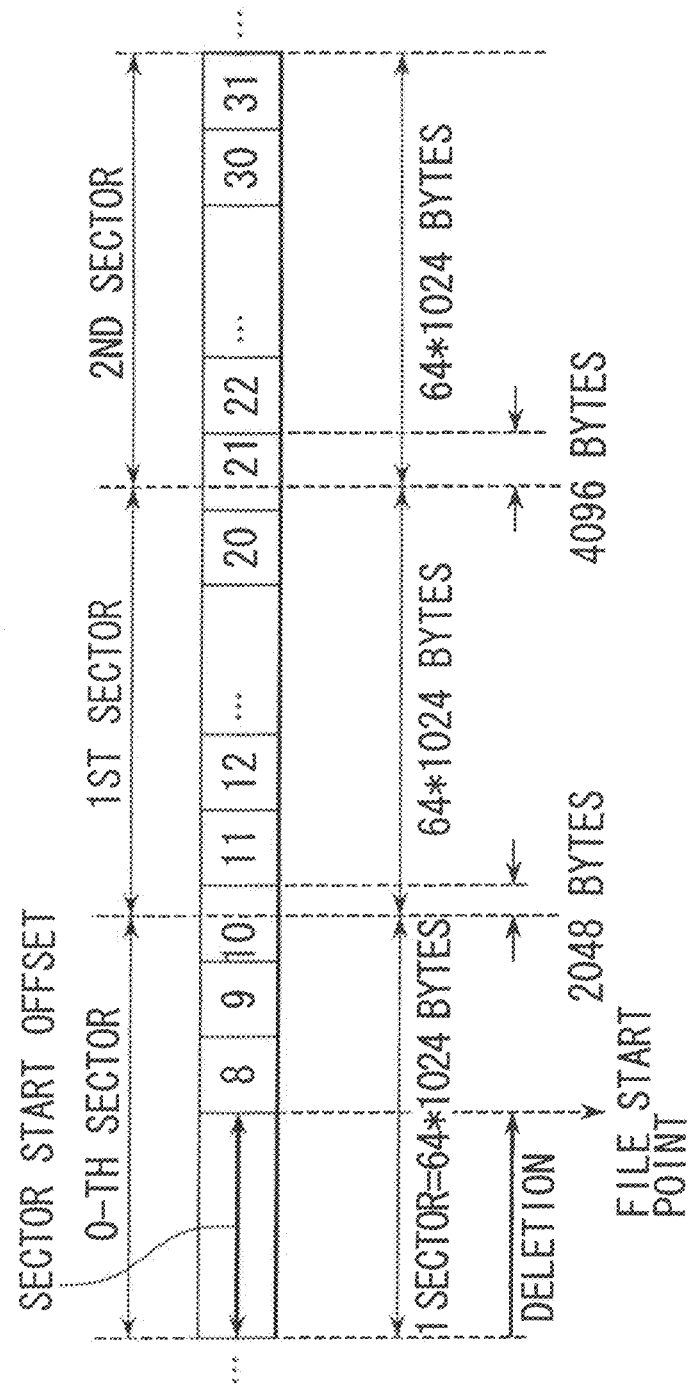
FIG. 20 is a drawing shown an example of erased aligned units previously recorded in a sector.

FIG. 20 shows an example of recorded data in the 0th sector, deleted up to a certain point in aligned units. In this example, the sector start offset showing the position of the file start point within the sector, is a value of 6144*i (i is an integer of 10 or less) bytes.

Figure 21:
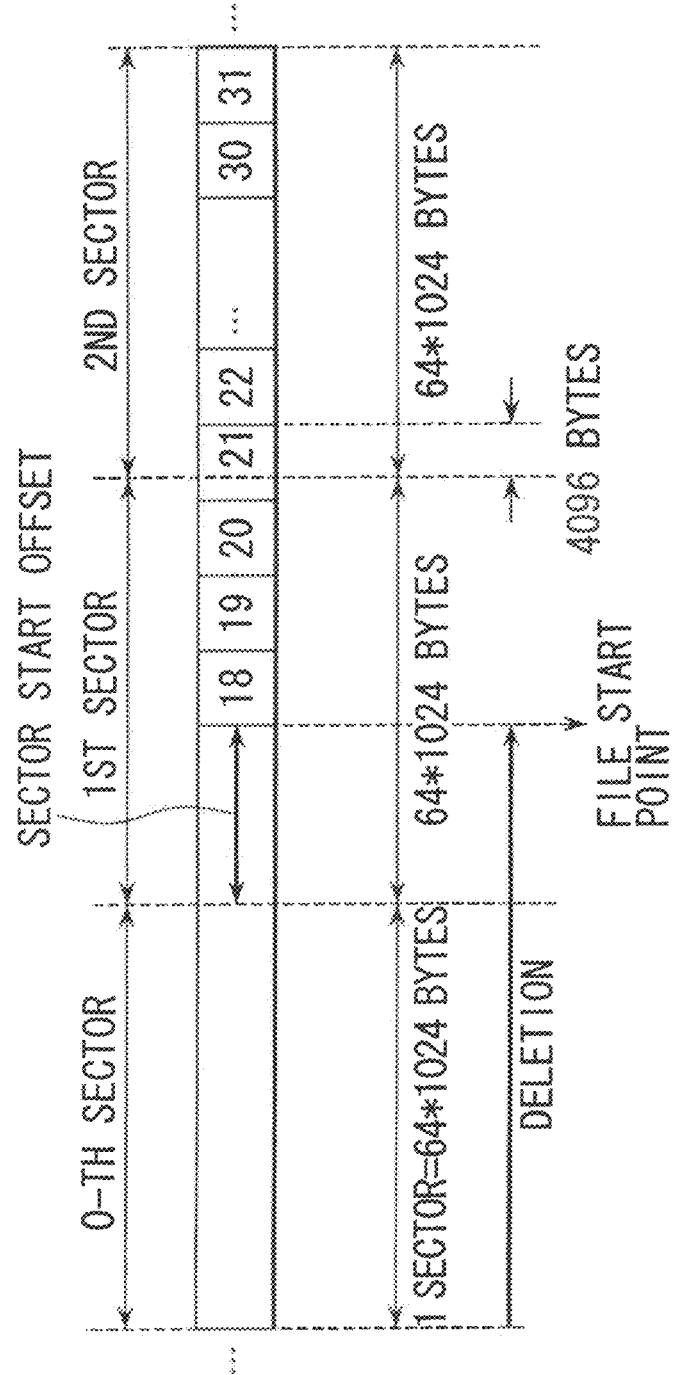
FIG. 21 is a drawing shown an example of erased aligned units previously recorded in a sector.

FIG. 21 shows an example of recorded data in the 1st sector, deleted up to a certain point in aligned units. In this example, the sector start offset showing the position of the file start point within the sector, is a value of 2048+6144*i bytes.

Figure 22:
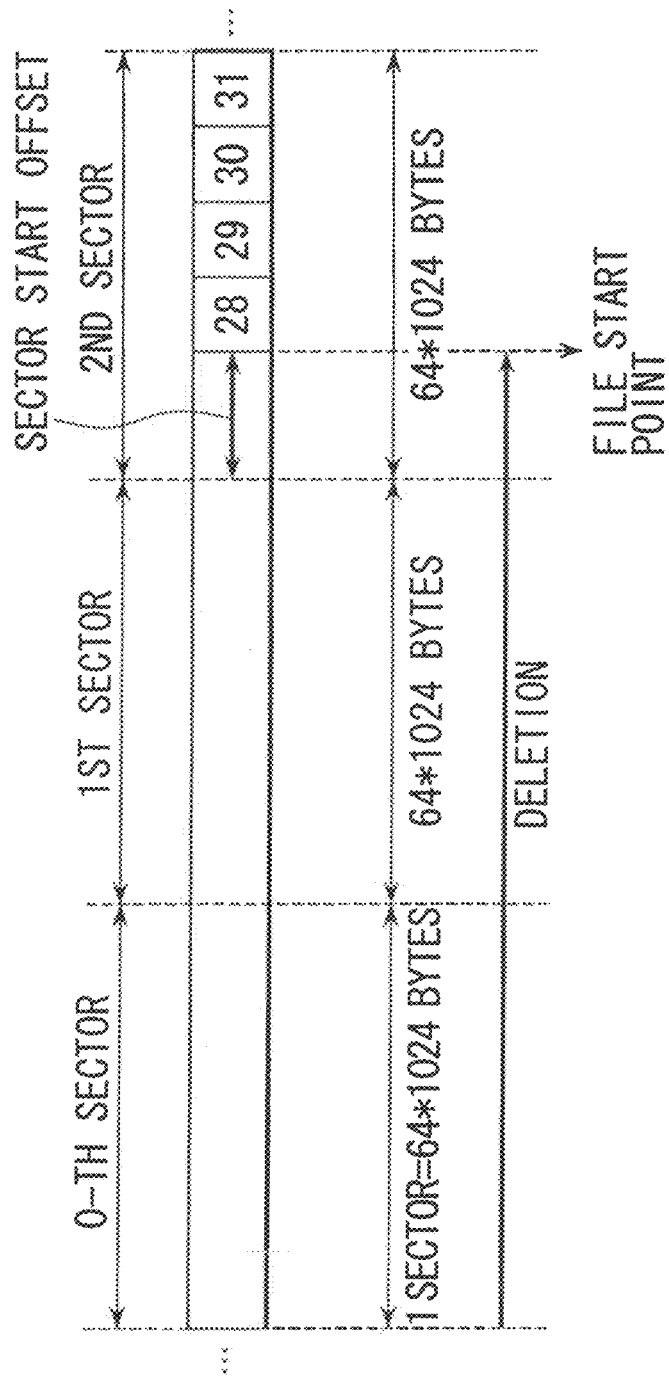
FIG. 22 is a drawing shown an example of erased aligned units previously recorded in a sector.

FIG. 22 shows an example of recorded data in the 2nd sector, deleted up to a certain point in aligned units. In this example, the sector start offset showing the position of the file start point within the sector, is a value of 4096+6144*i bytes.

In this case also, after the beginning portion of the file is deleted, along with revising (rewriting) the offset of the packet No. matching the packet No (offset_packet_number of FIG. 11) showing the entry point listed in the entry point map, the entry point data for referring to the entry point that was deleted in aligned units, is deleted from the entry point map.

To reproduce a DVR transport stream that was recorded in this way, the read out start position address of the DVR transport stream is established based on the packet No. showing the entry point recorded in the entry point map.

More specifically, the read out start position address of the DVR transport stream is established by the calculation shown below in processes (1) through (6).

In process (1), the offset sector No. OFT_SCT_NUM from the sector containing the file start point data to the sector containing the specified entry point data, is calculated by utilizing the following equation (4). The OFT_SCT_NUM supplies values for K, K+1, or K+2 shown in FIG. 18.

TMP_ALU_NO=TMP1/6144

TMP_OCN=TMP_ALU_NO*6144/65536

OFT_SCT_NUM=TMP_OCN−XN                    (4)

When the sector_start_offset%6144=0,
at  TMP1=(I_start_packet_No−offset_source_packet_number)*192+TMP2,
TMP2=sector_start_offset
XN=0
When the sector_start_offset %6144=2048,
TMP2=sector_start_offset+65536
XN=1
When the sector_start_offset %6144=4096,
TMP2=sector_start_offset+65536*2
XN=2

In process (2), REF_ALU_NO for the 0th through 31th aligned units shown in FIG. 18 (aligned units containing entry points) is calculated by utilizing the following equation (5).

REF_ALU_NO=TMP_ALU_NO%32                    (5)

In process (3), a check is made as to whether or not the REF_ALU_NO is 10 or 21. When the REF_ALU_NO is found to be 10 or 21, then the applicable aligned unit containing the entry point is determined to be striding the sector shown by the OFT_SCT_NUM, and the following sector.

When a check of the REF_ALU_NO shows it is not 10 or 21, then in process (4), then the offset quantity OST_F-ST_ALU from the sector start position shown by OFT_SCT_NUM, to the initial aligned unit provided with all data, is calculated using the following equation (6). The OST_F-ST_ALU supplies the 2048 byte or 4096 byte value shown in FIG. 18.

OST_FST_ALU=(TMP_OCN%3)*2048                    (6)

In process (5), the aligned unit quantity OFT_ALU_NUM for the offset from the initial aligned unit provided with all data to the aligned unit containing the entry point is calculated using the following equation (7). The OFT_ALU_NUM value indicates any of the offset No (0 through 9) for the aligned units provided with all data within the sector shown in FIG. 18.

OFT_ALU_NUM=REF_ALU_NO−XNUM                    (7)

When TMP_OCN%3=0,
XNUM=0
When TMP_OCN%3=1,
XNUM=11
When TMP_OCN%3=2,
XNUM=22

The offset packet quantity OFTEP from the beginning of the source packet to the entry point source packet, for the aligned units shown in OFT_ALU_NUM, in process (6), or for the aligned units are 10 or 21 of REF_ALU_NO in process (3), is calculated using the following equation (8).

OFTEP=(I_start_packet_No−offset_source_packet_number)%32)                    (8)

The processing sequence described above can be implemented with hardware, yet may also be implemented with software. When implementing the processing sequence with software, the program comprising that software may be installed in dedicated hardware incorporated into a computer or installed in the various programs, and installed from a recording medium such as a general-purpose personal computer capable of implementing the various functions.

The program may also be distributed to the user on a recording medium not using a computer as shown for instance in FIG. 1. The program may be provided to the user not only on a magnetic disk 24 (including floppy disks), an optical disk 25 (CD-ROM (compact disk read only memory)), a DVD (including digital versatile disk), an optical-magnetic disk (including MD (mini disk), or a packaged medium such as a semiconductor memory 27, but may also provided to the user as a program incorporated beforehand into the computer or a program recorded onto a ROM or hard disk, etc.

In these specifications, the steps for loading the program recorded on the recording medium were of course processed along a time base according to a recorded sequence. Of course, these processes may also be implemented one at a time or in parallel without necessarily always processing along a time base.

In these specifications, the term "system" is used to express the overall device comprised of a plurality of device units.

In the first transport stream recording device and transport stream record method, and also the program recording medium of the above described invention, the specified source packet added with transport packet header is collected into a specified number of pieces, and aligned units generated and recorded on the recording medium, so the effect is rendered that the transport packets can recorded with good efficiency onto the recording medium.

Further, in the second transport stream reproduction device and transport stream reproduction method, as well as the program recording medium in the above described invention, the specified source packet added with transport packet header, is sub-divided into a specified number of pieces and aligned units generated and recorded on the recording medium, so the effect is rendered that the transport packets can recorded with good efficiency onto the recording medium.

Still further, in the transport stream reproduction device and transport stream reproduction method, as well as the third program recording medium in the above described invention, the address on the data recording medium corresponding to the designated reproduction start position is calculated, and the loading (reading) commenced of transport packets from the calculated address on the data recording medium so the effect is rendered that the transport packets can loaded (read out) with good efficiency.

What is claimed:

1. A transport stream reproduction device for reproducing a transport stream recorded in data units on a recording medium, comprising:
    reproduction means for reproducing;
    calculating means for calculating an address corresponding to a designated reproduction start position designated by an entry point map listing, the map listing corresponding to a transport packet which contains an entry point; and
    a controller configured to control said reproduction section so that a read-out of transport packets starts from the calculated address;
    wherein each data unit is comprised of a predetermined specified number of collected source packets in which each source packet includes a transport packet attached with a header, to constitute said transport stream,
    wherein said controller further controls the reproduction section to acquire an entry point map from said recording medium, compare a presentation time stamp (PTS) listed in said entry point map with said designated reproduction start position, and search entry points adjacent to said designated reproduction start position, and said calculating means calculates an address of a transport packet corresponding to said entry points.

2. The transport stream reproduction device according to claim 1, further comprising:

deletion means for converting a designated deletion range into a data unit data region and to delete said data units in the data unit data region recorded on transport stream.

3. A transport stream reproduction method for a transport stream reproduction device for reproducing transport streams recorded in data units recorded on a recording medium, the method comprising:

calculating an address corresponding to a designated reproduction start position designated by an entry point map listing, the map listing corresponding to a transport packet which contains an entry point;

reading out said transport packet from said calculated address and controlling a start of a reproduction section of said transport stream reproduction device, wherein each data unit is comprised of a predetermined specified number of collected source packets in which each source packet includes a transport packet attached with a header, to constitute said transport stream;

controlling the reproduction section to acquire an entry point map from said recording medium, compare a presentation time stamp (PTS) listed in said entry point map with said designated reproduction start position, and search entry points adjacent to said designated reproduction start position; and calculating an address of a transport packet corresponding to said entry points.

4. A non-transitory computer readable storage medium including computer executable instructions, wherein the instructions, when executed by a transport stream reproduction device, cause the device to perform a method for reproducing transport streams recorded in data units on a data recording medium, the method comprising:

calculating an address corresponding to a designated reproduction start position designated by an entry point map listing, the map listing corresponding to a transport packet which contains an entry point;

reading out said transport packet from said calculated address and controlling a start of a reproduction section of said transport stream reproduction device, wherein each data unit comprised of a predetermined specified number of collected source packets in which each source packet includes a transport packet attached with a header, to constitute said transport stream;

controlling the reproduction section to acquire an entry point map from said recording medium, compare a presentation time stamp (PTS) listed in said entry point map with said designated reproduction start position, and search entry points adjacent to said designated reproduction start position; and calculating an address of a transport packet corresponding to said entry points.

5. A transport stream reproduction device for reproducing a transport stream recorded in data units on a data recording medium, comprising:

user input circuitry configured to receive specification of a reproduction start position;

a calculation means to calculate an address of said data recording medium corresponding to said specified reproduction start position designated by an entry point map listing, the map listing corresponding to a transport packet containing an entry point; and read-out means for starting readout of said transport packet from the address on said data recording medium calculated by said calculation means, wherein each data unit is comprised of a predetermined specified number of collected source packets in which each source packet includes a transport packet attached with a header, to constitute said transport stream;

acquisition means for acquiring an entry point map from said data recording medium; and searching means for comparing the specified reproduction start position with a presentation time stamp (PTS) listed in said entry point map and searching for an entry point adjacent to said specified reproduction start position, wherein said calculation means calculates the address of said recording medium recorded in said transport packet corresponding to said entry point, using a count contained in said entry point map.

6. The transport stream reproduction device according to claim 5, further comprising:

at least one processing circuit configured to convert a specified erase range into a data area for said data units; and delete said transport stream recorded in said data area for said data units.

* * * * *